US008286612B2

(12) United States Patent
Biasci et al.

(10) Patent No.: US 8,286,612 B2
(45) Date of Patent: Oct. 16, 2012

(54) COUPLING DEVICE

(75) Inventors: Enio Biasci, Campo (IT); Edoardo Giorgetti, Rosignano Marittimo (IT); Daniel Marc, France (IT); Giandomenico Serra, Pisa (IT)

(73) Assignee: Continental Automotive GmbH, Hannover (DE)

( * ) Notice: Subject to any disclaimer, the term of this patent is extended or adjusted under 35 U.S.C. 154(b) by 383 days.

(21) Appl. No.: 12/371,708

(22) Filed: Feb. 16, 2009

(65) Prior Publication Data

US 2009/0229576 A1 Sep. 17, 2009

(30) Foreign Application Priority Data

Feb. 19, 2008 (EP) .................................... 08003044

(51) Int. Cl.
*F02M 61/14* (2006.01)
*F16L 37/00* (2006.01)

(52) U.S. Cl. ......... 123/470; 123/456; 239/600; 285/305

(58) Field of Classification Search .................. 123/470, 123/456, 468, 469; 239/600; 285/305, 318, 285/348
See application file for complete search history.

(56) References Cited

U.S. PATENT DOCUMENTS

| | | | | | |
|---|---|---|---|---|---|
| 749,496 | A | | 1/1904 | Patterson et al. | 285/67 |
| 2,950,130 | A | | 8/1960 | Schneider | 285/67 |
| 3,260,539 | A | | 7/1966 | Herron | 285/24 |
| 3,414,297 | A | * | 12/1968 | Pollia | 285/98 |
| 3,908,621 | A | | 9/1975 | Hussey | 123/139 |
| 3,966,234 | A | * | 6/1976 | Sundholm | 285/24 |
| 4,143,625 | A | | 3/1979 | Kulke | 123/32 |
| 4,213,564 | A | | 7/1980 | Hulsing | 239/88 |
| 4,295,452 | A | | 10/1981 | Lembke et al. | 123/470 |
| 4,878,037 | A | * | 10/1989 | Mathews et al. | 333/254 |
| 4,982,983 | A | * | 1/1991 | Lenzi et al. | 285/281 |
| 5,024,198 | A | | 6/1991 | Usui | 123/468 |
| 5,038,738 | A | * | 8/1991 | Hafner et al. | 123/470 |
| 5,209,204 | A | * | 5/1993 | Bodenhausen et al. | 123/470 |

(Continued)

FOREIGN PATENT DOCUMENTS

DE 19941770 3/2001

(Continued)

OTHER PUBLICATIONS

European Search Report and Written Opinion for Application No. 09000673.5 (6 pages), Jun. 29, 2009.

*Primary Examiner* — Mahmoud Gimie
*Assistant Examiner* — David Hamaoui
(74) *Attorney, Agent, or Firm* — King & Spalding L.L.P.

(57) ABSTRACT

Coupling device for hydraulically and mechanically coupling a fuel injector to a combustion engine fuel rail, having a fuel injector cup with a central longitudinal axis hydraulically coupled to the rail and engaging a fuel inlet portion of the injector, a first ring element fixedly coupled to the cup, and a second ring element fixedly coupled to the injector. One of the ring elements has a collar arranged radially outside the other elements and extending from the one element in direction of the longitudinal axis. The collar has a recess facing the central longitudinal axis. A circlip is arranged in the recess and arranged and designed to form a positive fitting coupling between the first and second ring elements. The circlip prevents a movement of the first ring element relative to the second element retaining the fuel injector in the fuel injector cup in direction of the central longitudinal axis.

17 Claims, 3 Drawing Sheets

U.S. PATENT DOCUMENTS

| | | | | |
|---|---|---|---|---|
| 5,301,647 | A * | 4/1994 | Lorraine | 123/470 |
| 5,765,534 | A | 6/1998 | Brown et al. | 123/470 |
| 5,934,253 | A * | 8/1999 | Kojima et al. | 123/470 |
| 5,943,995 | A | 8/1999 | Niwa et al. | 123/470 |
| 6,102,007 | A | 8/2000 | Fürst | 123/469 |
| 6,148,797 | A | 11/2000 | Gmelin | 123/456 |
| 6,176,221 | B1 | 1/2001 | Hofmann | 123/470 |
| 6,223,727 | B1 | 5/2001 | Tahara et al. | 123/470 |
| 6,227,785 | B1 * | 5/2001 | Kilgore | 411/526 |
| 6,237,571 | B1 | 5/2001 | Harrison | 123/469 |
| 6,314,943 | B1 | 11/2001 | Burch et al. | 123/470 |
| 6,431,151 | B1 * | 8/2002 | Gmelin | 123/470 |
| 6,491,026 | B1 | 12/2002 | Andorfer | 123/470 |
| 6,499,468 | B1 | 12/2002 | Ferraro et al. | 123/470 |
| 6,543,421 | B2 | 4/2003 | Lorraine et al. | 123/470 |
| 6,715,802 | B2 * | 4/2004 | Baker | 285/368 |
| 6,718,949 | B2 * | 4/2004 | Gmelin | 123/470 |
| 6,745,753 | B2 | 6/2004 | Spinnler et al. | 123/509 |
| 6,830,034 | B2 | 12/2004 | Engelmeyer et al. | 123/470 |
| 6,830,036 | B2 | 12/2004 | Okajima et al. | 123/470 |
| 6,860,008 | B2 | 3/2005 | Bodenhausen et al. | 29/855 |
| 6,877,484 | B2 | 4/2005 | Reiter | 123/468 |
| 6,923,162 | B2 | 8/2005 | Reiter | 123/490 |
| 7,051,961 | B2 * | 5/2006 | Mills et al. | 239/585.4 |
| 7,063,075 | B2 | 6/2006 | Berger et al. | 123/470 |
| 7,188,611 | B2 | 3/2007 | Schmieder | 123/469 |
| 7,195,003 | B2 * | 3/2007 | Liskow | 123/470 |
| 7,334,571 | B1 * | 2/2008 | Beardmore | 123/470 |
| 7,445,252 | B2 | 11/2008 | Ho | 285/409 |
| 7,516,735 | B1 | 4/2009 | Doherty et al. | 123/468 |
| 7,591,489 | B2 | 9/2009 | Woo | 285/365 |
| 7,712,797 | B2 | 5/2010 | Lum | 285/414 |
| 7,765,984 | B2 * | 8/2010 | Fuerst et al. | 123/456 |
| 7,828,338 | B2 | 11/2010 | Kertesz et al. | 285/365 |
| 7,861,692 | B2 * | 1/2011 | Biasci et al. | 123/470 |
| 7,874,282 | B2 | 1/2011 | Ghelardi et al. | 123/470 |
| 7,934,488 | B2 * | 5/2011 | Biasci et al. | 123/470 |
| 2002/0100456 | A1 | 8/2002 | Panasuk et al. | 123/456 |
| 2005/0284449 | A1 | 12/2005 | Zdroik | 123/516 |
| 2008/0042434 | A1 | 2/2008 | Kenny | 285/354 |
| 2008/0053409 | A1 | 3/2008 | Beardmore | |
| 2008/0169364 | A1 | 7/2008 | Zdroik et al. | 239/533.2 |
| 2008/0216798 | A1 | 9/2008 | Ghelardi et al. | 123/470 |
| 2009/0173317 | A1 * | 7/2009 | Doherty et al. | 123/470 |
| 2009/0229575 | A1 * | 9/2009 | Giorgetti et al. | 123/470 |
| 2009/0229576 | A1 | 9/2009 | Biasci et al. | 123/470 |
| 2010/0012093 | A1 | 1/2010 | Pepperine et al. | 123/470 |
| 2010/0018502 | A1 | 1/2010 | Fischetti et al. | 123/470 |
| 2010/0192913 | A1 | 8/2010 | Keidel et al. | 123/470 |

FOREIGN PATENT DOCUMENTS

| | | | | |
|---|---|---|---|---|
| DE | 10108203 | | | 8/2002 |
| DE | 102004037117 | | | 3/2006 |
| DE | WO2006/092427 | | * | 9/2006 |
| DE | 102005020380 | | | 11/2006 |
| DE | 102005024044 | | | 11/2006 |
| DE | 102006042597 | A1 | | 3/2008 |
| EP | 1255038 | | | 11/2002 |
| EP | 1279825 | | | 1/2003 |
| EP | 1460264 | A1 | | 9/2004 |
| EP | 1818535 | | | 8/2007 |
| FR | 2637021 | A1 | | 3/1990 |
| FR | 2872252 | | | 12/2005 |
| GB | 2024937 | | | 1/1980 |
| JP | 1096464 | | | 4/1989 |
| WO | 0118384 | | | 3/2001 |
| WO | 03038267 | | | 5/2003 |
| WO | 03046370 | | | 6/2003 |

* cited by examiner

COUPLING DEVICE

CROSS-REFERENCE TO RELATED APPLICATIONS

This application claims priority to EP Patent Application No. 08003044 filed Feb. 19, 2008, the contents of which is incorporated herein by reference in its entirety.

TECHNICAL FIELD

The invention relates to a coupling device for hydraulically and mechanically coupling a fuel injector to a fuel rail of a combustion engine.

BACKGROUND

Coupling devices for hydraulically and mechanically coupling a fuel injector to a fuel rail are in widespread use, in particular for internal combustion engines. Fuel can be supplied to an internal combustion engine by the fuel rail assembly through the fuel injector. The fuel injectors can be coupled to the fuel injector cups in different manners.

In order to keep pressure fluctuations during the operation of the internal combustion engine at a very low level, internal combustion engines are supplied with a fuel accumulator to which the fuel injectors are connected and which has a relatively large volume. Such a fuel accumulator is often referred to as a common rail.

Known fuel rails comprise a hollow body with recesses in form of fuel injector cups, wherein the fuel injectors are arranged. The connection of the fuel injectors to the fuel injector cups that supply the fuel from a fuel tank via a low or high-pressure fuel pump needs to be very precise to get a correct injection angle and a sealing of the fuel.

SUMMARY

According to various embodiments, a coupling device for hydraulically and mechanically coupling a fuel injector to a fuel rail can be created which is simply to be manufactured and which facilitates a reliable and precise connection between the fuel injector and the fuel injector cup without a resting of the fuel injector on the cylinder head.

According to an embodiment, a coupling device for hydraulically and mechanically coupling a fuel injector to a fuel rail of a combustion engine, may comprise a fuel injector cup having a central longitudinal axis and being designed to be hydraulically coupled to the fuel rail and to engage a fuel inlet portion of the fuel injector, a first ring element being fixedly coupled to the fuel injector cup, and a second ring element being fixedly coupled to the fuel injector, wherein one of the ring elements comprises a collar being arranged radially outside the other of the ring elements and extending from the one of the ring elements in direction of the central longitudinal axis, and the collar having a recess facing the central longitudinal axis, and a circlip is arranged in the recess and is arranged and designed to form a positive fitting coupling between the first ring element and the second ring element, the circlip being designed to prevent a movement of the first ring element relative to the second ring element to retain the fuel injector in the fuel injector cup in direction of the central longitudinal axis.

According to a further embodiment, the collar can be fixedly coupled to the second ring element. According to a further embodiment, the fuel injector cup may have a groove, a first snap ring can be arranged in the groove and can be designed to fixedly couple the first ring element to the fuel injector cup. According to a further embodiment, the groove and the first snap ring can be arranged and designed to form a positive fitting coupling between the first ring element and the fuel injector cup which can be designed to prevent a movement of the first ring element relative to the fuel injector cup at least in a first direction of the central longitudinal axis. According to a further embodiment, a welding seam can be arranged between the first ring element and the fuel injector cup to fixedly couple the first ring element to the fuel injector cup. According to a further embodiment, the first ring element can be in one part with the fuel injector cup. According to a further embodiment, the fuel injector may comprise a groove, a second snap ring can be arranged in the groove of the fuel injector and can be designed to fixedly couple the second ring element to the fuel injector. According to a further embodiment, the groove of the fuel injector and the second snap ring can be arranged and designed to form a positive fitting coupling between the second ring element and the fuel injector which is designed to prevent a movement of the second ring element relative to the fuel injector at least in a second direction of the central longitudinal axis opposing the first direction of the central longitudinal axis. According to a further embodiment, a welding seam can be arranged between the second ring element and the fuel injector to fixedly couple the second ring element to the fuel injector. According to a further embodiment, the second ring element can be in one part with the fuel injector.

BRIEF DESCRIPTION OF THE DRAWINGS

Embodiments are explained in the following with the aid of schematic drawings. These are as follows.

Elements of the same design and function that occur in different illustrations are identified by the same reference character.

DETAILED DESCRIPTION

Figure 1:
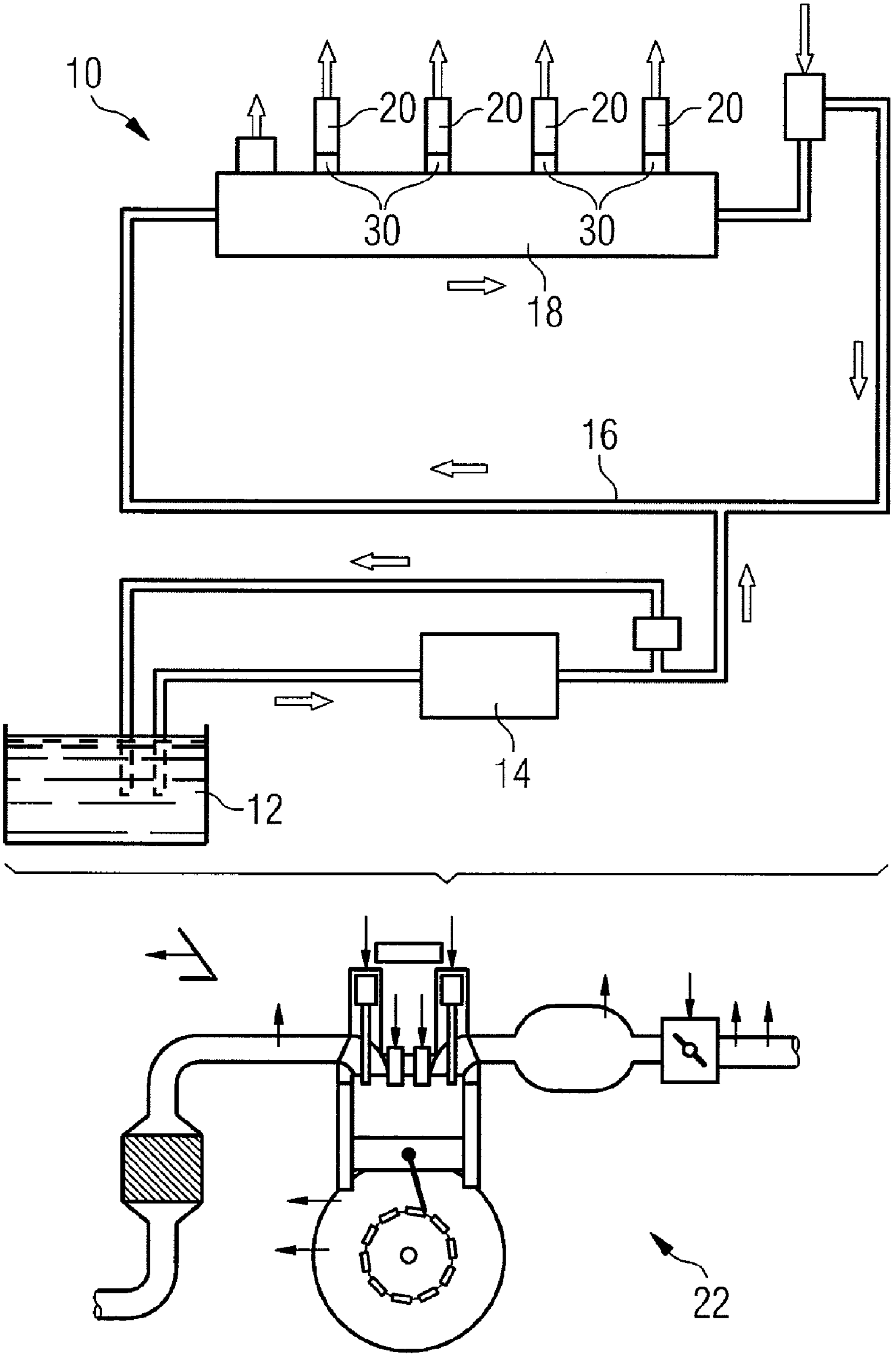
FIG. 1 an internal combustion engine in a schematic view.

The various embodiments are distinguished by a coupling device for hydraulically and mechanically coupling a fuel injector to a fuel rail of a combustion engine, the coupling device comprising a fuel injector cup having a central longitudinal axis and being designed to be hydraulically coupled to the fuel rail and to engage a fuel inlet portion of the fuel injector, a first ring element being fixedly coupled to the fuel injector cup, and a second ring element being fixedly coupled to the fuel injector. One of the ring elements comprises a collar which is arranged radially outside the other of the ring elements and extends from the one of the ring elements in direction of the central longitudinal axis. The collar has a recess facing the central longitudinal axis. A circlip is arranged in the recess and is arranged and designed to form a positive fitting coupling between the first ring element and the second ring element. The circlip is designed to prevent a movement of the first ring element relative to the second ring element to retain the fuel injector in the fuel injector cup in direction of the central longitudinal axis.

This has the advantage that a fast and secure coupling between the fuel injector and the fuel injector cup is possible. The coupling device can resist the high fuel pressures in the fuel injector and the fuel injector cup. Furthermore, the use of internal circlips is possible. Additionally, the coupling of the fuel injector with the fuel rail by the ring elements of the fuel injector and the fuel injector cup allows an assembly of the fuel injector and the fuel rail without a further metallic contact between the fuel injector and further parts of the combustion engine. Consequently, a noise transmission between the fuel injector and further parts of the combustion engine can be kept small.

In an embodiment the collar is fixedly coupled to the second ring element. This has the advantage that a good accessibility of the circlip is possible. In particular, in usual arrangements of fuel injectors a good accessibility from the top of the coupling device is possible.

In a further embodiment the fuel injector cup comprises a groove, and a first snap ring is arranged in the groove and is designed to fixedly couple the first ring element to the fuel injector cup. This may allow a simple construction of the coupling device which enables to carry out a fast and secure but reversible coupling of the first ring element to the fuel injector cup.

In a further embodiment the groove and the first snap ring are arranged and designed to form a positive fitting coupling between the first ring element and the fuel injector cup which is designed to prevent a movement of the first ring element relative to the fuel injector cup at least in a first direction of the central longitudinal axis. By this a secure coupling of the first ring element to the fuel injector cup is enabled.

In a further embodiment the coupling device has a welding seam which is arranged between the first ring element and the fuel injector cup to fixedly couple the first ring element to the fuel injector cup. This allows a simple construction of the coupling device and carrying out a very secure coupling of the fuel injector to the fuel injector cup.

In a further embodiment the first ring element is in one part with the fuel injector cup. This has the advantage that a very secure coupling of the fuel injector to the fuel injector cup is possible. Furthermore, a simple machining of the first ring element together with the fuel injector cup is possible.

In a further embodiment the fuel injector comprises a groove, a second snap ring is arranged in the groove of the fuel injector and is designed to fixedly couple the second ring element to the fuel injector. This may allow a simple construction of the coupling device which enables to carry out a fast and secure but reversible coupling of the second ring element to the fuel injector.

In a further embodiment the groove of the fuel injector and the second snap ring are arranged and designed to form a positive fitting coupling between the second ring element and the fuel injector which is designed to prevent a movement of the second ring element relative to the fuel injector at least in a second direction of the central longitudinal axis opposing the first direction of the central longitudinal. By this a secure coupling of the second ring element to the fuel injector is enabled.

In a further embodiment a welding seam is arranged between the second ring element and the fuel injector to fixedly couple the second ring element to the fuel injector. This allows a simple construction of the coupling device and carrying out a very secure coupling of the fuel injector to the fuel injector cup.

In a further embodiment the second ring element is in one part with the fuel injector. This has the advantage that a very secure coupling of the fuel injector to the fuel injector cup is possible. Furthermore, a simple machining of the second ring element together with the fuel injector is possible.

In a further embodiment one of the ring elements is designed and arranged to enable a screw coupling between the ring elements. This has the advantage that a simple construction of the coupling device is possible which allows carrying out a fast and secure coupling of the fuel injector in the fuel injector cup. Furthermore, a defined positioning of the fuel injector relative to the fuel injector cup in axial and circumferential direction is enabled.

A fuel feed device 10 is assigned to an internal combustion engine 22 (FIG. 1) which can be a diesel engine or a gasoline engine. It includes a fuel tank 12 that is connected via a first fuel line to a fuel pump 14. The output of the fuel pump 14 is connected to a fuel inlet 16 of a fuel rail 18. In the fuel rail 18, the fuel is stored for example under a pressure of about 200 bar in the case of a gasoline engine or of about 2,000 bar in the case of a diesel engine. Fuel injectors 20 are connected to the fuel rail 18 and the fuel is fed to the fuel injectors 20 via the fuel rail 18.

Figure 2:
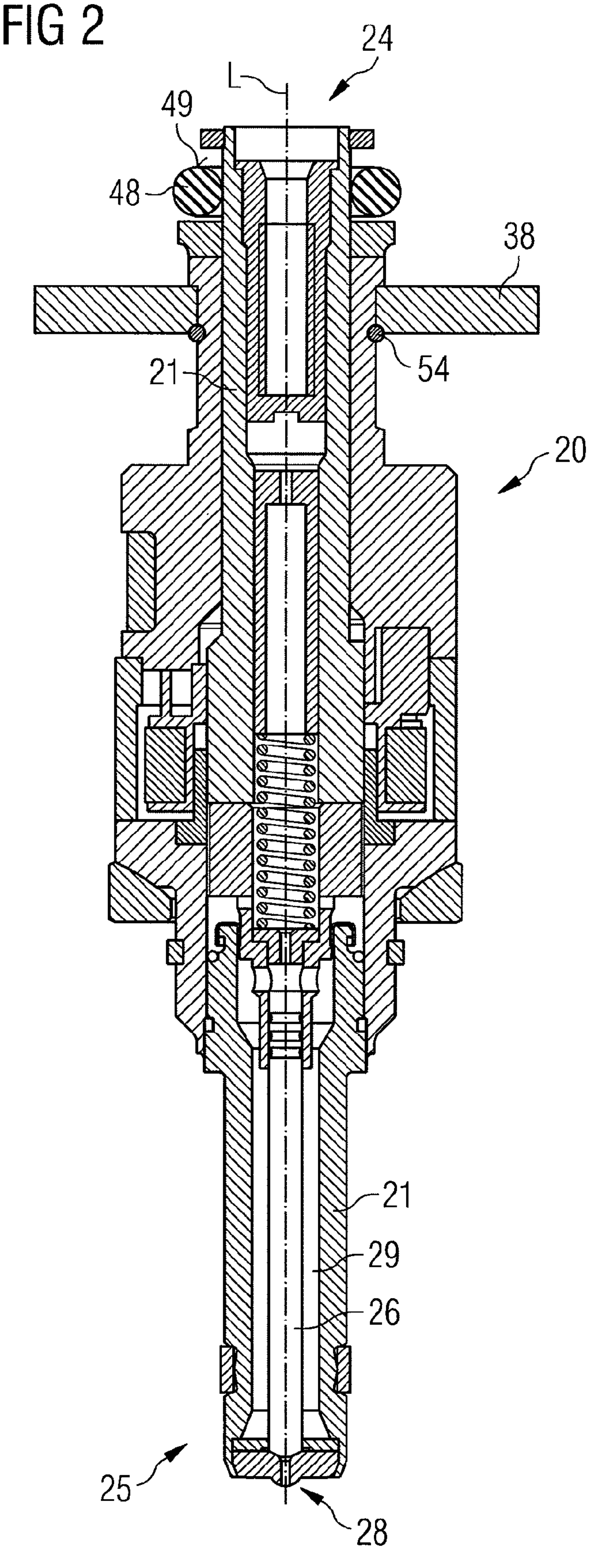
FIG. 2 a longitudinal section through a fuel injector.

FIG. 2 shows the fuel injector 20. The fuel injector 20 has a fuel injector body 21 and is suitable for injecting fuel into a combustion chamber of the internal combustion engine 22. The fuel injector 20 has a fuel inlet portion 24 and a fuel outlet portion 25.

Furthermore, the fuel injector 20 comprises a valve needle 26 taken in a cavity 29 of the fuel injector body 21. On a free end of the fuel injector 20 an injection nozzle 28 is formed which is closed or opened by an axial movement of the valve needle 26. In a closing position a fuel flow through the injection nozzle 28 is prevented. In an opening position fuel can flow through the injection nozzle 28 into the combustion chamber of the internal combustion engine 22.

Figure 3:
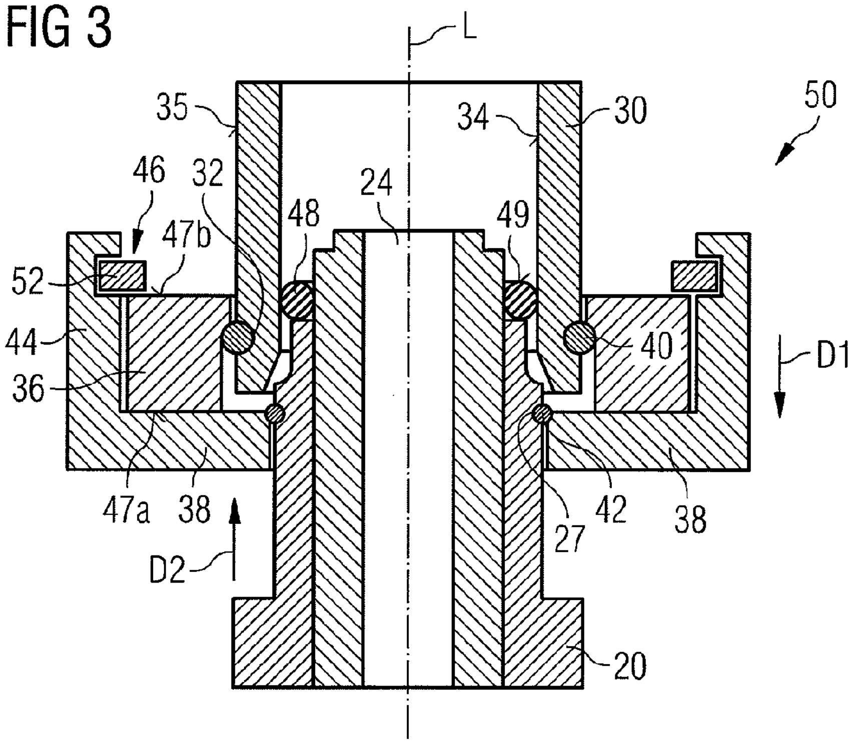
FIG. 3 a longitudinal section through a first embodiment of a coupling device, FIG. 4 a longitudinal section through a second embodiment of the coupling device, and FIG. 5 a longitudinal section through a third embodiment of the coupling device.
Figure 4:
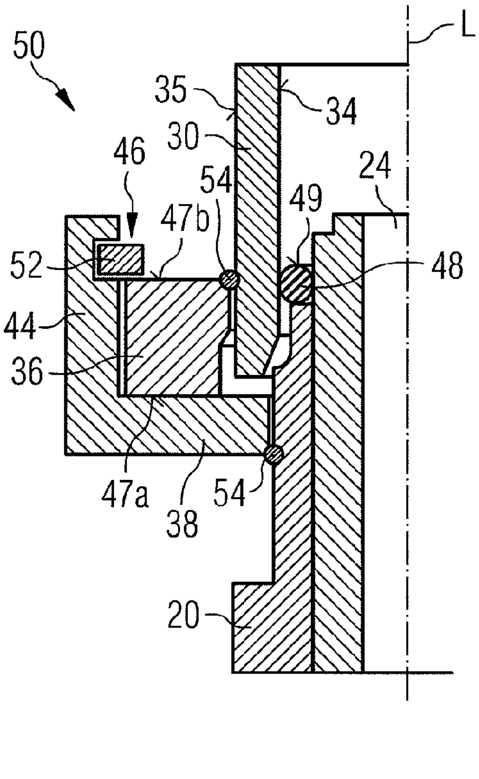
Figure 5:
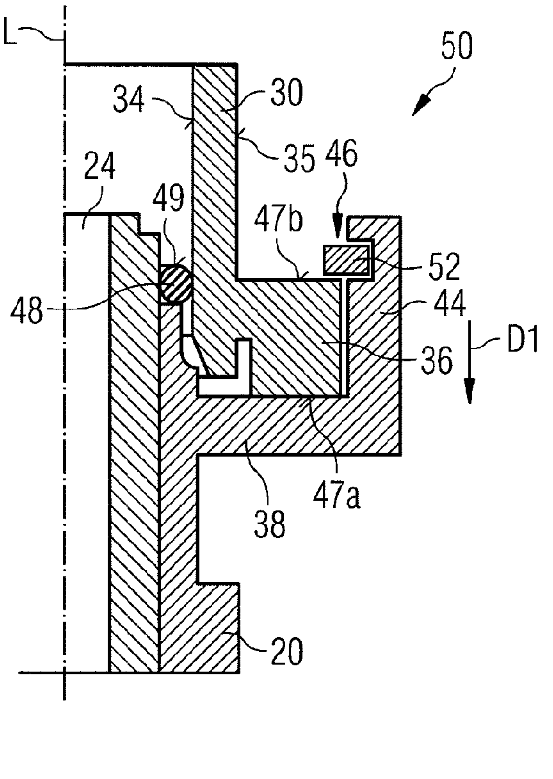

FIGS. 3 to 5 show different embodiments of a coupling device 50 which is coupled to the fuel rail 18 of the internal combustion engine 22. The coupling device 50 has a fuel injector cup 30, a first ring element 36, a second ring element 38 and a circlip 52.

The fuel injector cup 30 comprises a central longitudinal axis L, an inner surface 34 and an outer surface 35 and is hydraulically coupled to the fuel rail 18. Furthermore, the fuel injector cup 30 is in engagement with the fuel inlet portion 24 of the fuel injector 20. The fuel inlet portion 24 of the fuel injector 20 comprises a sealing ring 48 with an outer surface 49 which is in sealing contact with the inner surface 34 of the fuel injector cup 30.

The first ring element 36 has a cylindrical shape and is fixedly coupled to the fuel injector cup 30. The first ring element 36 has a first contact surface 47*a* facing the second ring element 38 in axial direction and a second contact surface 47*b* facing away from the second ring element 38 in axial direction.

The second ring element 38 has a cylindrical shape and is fixedly coupled to the fuel injector 20. The second ring element 38 comprises a collar 44. In the shown embodiment of the coupling device 50 the collar 44 is one piece with the second ring element 38. In further embodiments the collar 44 can be a separate part which is fixedly coupled to the second ring element 38. In further embodiments the first ring element 36 can comprise the collar 44.

The collar 44 extends from the second ring element 38 in direction of the central longitudinal axis L. The collar 44 has a recess 46 facing the central longitudinal axis L.

FIG. 3 shows an embodiment of the coupling device 50 wherein the fuel injector cup 30 has a groove 32 and the fuel injector 20 has a groove 27. The coupling device 50 has a first snap ring 40 which is arranged in the groove 32 of the fuel injector cup 30 and a second snap ring 42 which is arranged in the groove 27 of the fuel injector 20. The first ring element 36 is in engagement with the first snap ring 40 and the second ring element 38 is in engagement with the second snap ring 42.

The first snap ring 40 enables a positive fitting coupling between the first ring element 36 and the fuel injector cup 30 to prevent a movement of the first ring element 36 relative to the fuel injector cup 30 in a first direction D1. The second snap ring 42 enables a positive fitting coupling between the second ring element 38 and the fuel injector 20 to prevent a movement of the second ring element 38 relative to the fuel injector 20 in a second direction D2. The first direction D1 and the second direction D2 are opposing directions of the central longitudinal axis L.

The circlip 52 is arranged in the recess 46 and forms a positive fitting coupling between the first ring element 36 and the second ring element 38. The circlip 52 prevents a movement of the first ring element 36 relative to the second ring element 38.

As the first ring element 36 is fixedly coupled to the fuel injector cup 30, the second ring element 38 is fixedly coupled to the fuel injector 20 and the first ring element 36 is fixedly coupled to the second ring element 38 by the circlip 52, the fuel injector 20 is retained in the fuel injector cup 30 in direction of the central longitudinal axis L.

In the following, the assembly and disassembly of the fuel injector 20 with the fuel injector cup 30 according to the embodiment of FIG. 3 will be described:

For assembling, the first ring element 36 is shifted over the fuel injector cup 30, the first snap ring 40 is shifted into the groove 32 of the fuel injector cup 30, the second ring element 38 is shifted over the fuel injector 20 and the second snap ring 42 is shifted into the groove 27 of the fuel injector 20. Additionally, the first ring element 36 is shifted on the fuel injector cup 30 until it is in a positive fitting coupling with the fuel injector cup 30 to prevent a movement of the first ring element 36 relative to the fuel injector cup 30 in the first direction D1 of the central longitudinal axis L. Furthermore, the second ring element 38 is shifted over the fuel injector 20 until it is in a positive fitting coupling with the fuel injector 20 to prevent a movement of the second ring element 38 relative to the fuel injector 20 in the second direction D2 of the central longitudinal axis L opposing the first direction D1 of the central longitudinal axis L.

Furthermore, the fuel inlet portion 24 of the fuel injector 20 is shifted into the fuel injector cup 30 in a way that the first contact surface 47*a* of the first ring element 36 is in contact with the second ring element 38. Then, the circlip 52 is inserted into the recess 46 of the collar 44 whereby the circlip 52 is in contact with the second contact surface 47*b*. Now a state as shown in FIG. 3 is obtained. As can be seen in FIG. 3, the inner surface 34 of the fuel injector cup 30 is in sealing engagement with the outer surface 49 of the sealing ring 48. After the assembly process fuel can flow through the fuel injector cup 30 into the fuel inlet portion 24 of the fuel injector 20 without fuel leakage.

To disassemble the fuel injector 20 from the fuel injector cup 30, the circlip 52 is removed and the fuel injector 20 can be shifted away from the fuel injector cup 30 in axial direction and the fuel injector cup 30 and the fuel injector 20 can be separated from each other.

In the embodiment of FIG. 4 the coupling device 50 has welding seams 54 between the first ring element 36 and the fuel injector cup 30 and between the second ring element 38 and the fuel injector 20. The ring elements 36, 38 are rigidly coupled to the fuel injector cup 30 and the fuel injector 20 respectively by the welding seams 54.

In the following the assembly and disassembly of the fuel injector 20 with the fuel injector cup 30 of the embodiment of FIG. 4 will be described:

For assembling the fuel injector 20 with the fuel injector cup 30, the first ring element 36 is shifted over the fuel injector cup 30 and the second ring element 38 is shifted over the fuel injector 20. The welding seams 54 are attached to fixedly couple the first ring element 36 to the fuel injector cup 30 and the second ring element 38 to the fuel injector 20. The fuel inlet portion 24 of the fuel injector 20 is pushed into the fuel injector cup 30. By shifting the fuel injector 20 in axial direction into the fuel injector cup 30, the inner surface 34 of the fuel injector cup 30 is in sealing engagement with the outer surface 49 of the sealing ring 48. The circlip 52 is inserted into the recess 46 of the second ring element 38 as described for FIG. 3.

The disassembly of the fuel injector 20 from the fuel injector cup 30 of the embodiment of the coupling device 50 of FIG. 4 is carried in the same manner as described for the embodiment of FIG. 3.

In the embodiment of the coupling device 50 of FIG. 5 the first ring element 36 is in one part with the fuel injector cup 30 and the second ring 38 is in one part with the fuel injector 20. By this a very rigid and very secure coupling between the fuel injector cup 30 and the fuel injector 20 is possible.

For assembling the fuel injector 20 with the fuel injector cup 30 according to the embodiment of FIG. 5, the fuel inlet portion 24 of the fuel injector 20 is pushed into the fuel injector cup 30 and the circlip 52 is inserted into the recess 46 of the second ring element 38.

The disassembly of the fuel injector 20 from the fuel injector cup 30 of the embodiment of the coupling device 50 of FIG. 5 is carried in the same manner as described for the embodiment of FIG. 3.

The coupling of the fuel injector 20 with the fuel rail 18 by the ring elements 36, 38 and the circlip 52 allows an assembly of the fuel injector 20 and the fuel injector cup 30 without a further metallic contact between the fuel injector 20 and the further parts of the internal combustion engine 22. A sealing between the fuel injector body 21 and a combustion chamber of the internal combustion engine 22 can be carried out by a plastic element, in particular by a PTFE element. Consequently, noise transmission between the fuel injector 20 and further parts of the internal combustion engine can be kept small.

What is claimed is:

1. A coupling device for hydraulically and mechanically coupling a fuel injector to a fuel rail of a combustion engine, the coupling device comprising:

- a fuel injector cup having a central longitudinal axis and being designed to be hydraulically coupled to the fuel rail and to engage a fuel inlet portion of the fuel injector,
- a first ring element being fixedly coupled to the fuel injector cup, and
- a second ring element being fixedly coupled to the fuel injector, wherein
- the second ring element comprises a contact portion extending radially outward relative to the central longitudinal axis and a collar being arranged radially outside the other of the ring elements and extending from the contact portion in a direction of the central longitudinal axis, wherein the other of the ring elements is received in the collar and abuts the contact portion of the second ring element to form a ring element assembly, and the collar of the second ring element having a recess facing the central longitudinal axis, and wherein a circlip is arranged in the recess and is arranged and designed to form a positive fitting coupling between the first ring element and the second ring element, the circlip being designed to prevent a movement of the first ring element relative to the second ring element to retain the fuel injector in the fuel injector cup in direction of the central longitudinal axis, and the collar of the second ring element being configured such that when the other of the ring elements is received in the collar and abuts the contact portion of the second ring element to form the ring element assembly, a ring-shaped gap between an inner surface of the collar and an opposite outer surface of a cylindrical element is sufficiently sized to receive the circlip from outside the ring element assembly and into the recess in the collar.

2. The coupling device according to claim 1, wherein the collar is fixedly coupled to the second ring element.

3. The coupling device according to claim 1, wherein the fuel injector cup has a groove, a first snap ring is arranged in the groove and is designed to fixedly couple the first ring element to the fuel injector cup.

4. The coupling device according to claim 3, wherein the groove and the first snap ring are arranged and designed to form a positive fitting coupling between the first ring element and the fuel injector cup which is designed to prevent a movement of the first ring element relative to the fuel injector cup at least in a first direction of the central longitudinal axis.

5. The coupling device according to claim 1, wherein a welding seam is arranged between the first ring element and the fuel injector cup to fixedly couple the first ring element to the fuel injector cup.

6. The coupling device according to claim 1, wherein the first ring element is in one part with the fuel injector cup.

7. The coupling device according to claim 1, wherein the fuel injector comprises a groove, a second snap ring is arranged in the groove of the fuel injector and is designed to fixedly couple the second ring element to the fuel injector.

8. The coupling device according to claim 7, wherein the groove of the fuel injector and the second snap ring are arranged and designed to form a positive fitting coupling between the second ring element and the fuel injector which is designed to prevent a movement of the second ring element relative to the fuel injector at least in a second direction of the central longitudinal axis opposing the first direction of the central longitudinal axis.

9. The coupling device according to claim 1, wherein a welding seam is arranged between the second ring element and the fuel injector to fixedly couple the second ring element to the fuel injector.

10. The coupling device according to claim 1, wherein the second ring element is in one part with the fuel injector.

11. A method for hydraulically and mechanically coupling a fuel injector to a fuel rail of a combustion engine, comprising the steps of:

designing a fuel injector cup having a central longitudinal axis to be hydraulically coupled to the fuel rail and to engage a fuel inlet portion of the fuel injector, coupling a first ring element fixedly to the fuel injector cup, and coupling a second ring element fixedly to the fuel injector, wherein the second ring element comprises a contact portion extending radially outward relative to the central longitudinal axis and a collar being arranged radially outside the other of the ring elements and extending from the contact portion in a direction of the central longitudinal axis, the collar having a recess facing the central longitudinal axis, inserting the other of the ring elements to a position radially inside the collar and abutting the contact portion of the second ring element to form a ring element assembly, the collar being configured such the ring element assembly defines a ring-shaped gap between an inner surface of the collar and an opposite outer surface of a cylindrical element is sufficiently sized to receive a circlip through the ring-shaped gap, and passing the circlip through the ring-shaped gap and into the recess, such that the circlip forms a positive fitting coupling between the first ring element and the second ring element, the circlip being designed to prevent a movement of the first ring element relative to the second ring element to retain the fuel injector in the fuel injector cup in direction of the central longitudinal axis.

12. The method according to claim 11, wherein the fuel injector cup has a groove, the method comprising the step of arranging a first snap ring in the groove to fixedly couple the first ring element to the fuel injector cup.

13. The coupling device according to claim 12, comprising the step of arranging the groove and the first snap ring to form a positive fitting coupling between the first ring element and the fuel injector cup which is designed to prevent a movement of the first ring element relative to the fuel injector cup at least in a first direction of the central longitudinal axis.

14. The coupling device according to claim 11, comprising the step of arranging a welding seam between the first ring element and the fuel injector cup to fixedly couple the first ring element to the fuel injector cup.

15. The coupling device according to claim 11, wherein the fuel injector comprises a groove, the method comprising the step of arranging a second snap ring in the groove of the fuel injector to fixedly couple the second ring element to the fuel injector.

16. The coupling device according to claim 15, comprising the step of arranging the groove of the fuel injector and the second snap ring to form a positive fitting coupling between the second ring element and the fuel injector which is designed to prevent a movement of the second ring element relative to the fuel injector at least in a second direction of the central longitudinal axis opposing the first direction of the central longitudinal axis.

17. The coupling device according to claim 11, comprising the step of arranging a welding seam between the second ring element and the fuel injector to fixedly couple the second ring element to the fuel injector.

* * * * *